United States Patent Office.

JOHN F. KENNEDY, OF BOSTON, MASSACHUSETTS.

ANTISEPTIC SOLUTION.

SPECIFICATION forming part of Letters Patent No. 295,876, dated March 25, 1884.

Application filed October 15, 1883. (No specimens.)

*To all whom it may concern:*

Be it known that I, JOHN F. KENNEDY, of Boston, in the county of Suffolk and State of Massachusetts, have invented certain new and useful Improvements in Preserving Animal and Vegetable Matter, of which the following is a full, clear, and exact description.

This invention has for its object the preservation from decay of meats, fruits, or other animal or vegetable matter; and the invention consists in treating meats, fruits, or other animal or vegetable matter with a compound substantially as hereinafter fully described.

In carrying out this invention, first put into a suitable kettle five (5) gallons of water, and placing it over the fire boil the water until all vegetable matter in the water is destroyed, which occurs soon after the water boils. Then take of the following ingredients: crystallized alum, five (5) ounces; granulated sugar, two and one-half (2½) pounds; saltpeter, three (3) ounces; and gum-arabic, two and one-half (2½) ounces, and dissolve each separately in a sufficient quantity of the above boiled water until fully dissolved, having first pulverized each to facilitate such dissolution. Then put each and all of the solutions into the kettle with the balance of the water not used for dissolving them, and stir and agitate the whole until they are all thoroughly mixed together, when strain the compound through a fine strainer to remove all foreign particles, and cool the same, when it is ready for use.

In the use of this compound for the purposes of this invention, the meat or other animal or vegetable matter to be treated, in order to preserve the same from decay, is entirely immersed in the compound liquid, and allowed to remain therein from ten (10) to fifteen (15) seconds, when it is removed therefrom and hung up to dry, care being taken that none of the liquid is disturbed or washed off the surface of the meat, &c. As the liquid dries, it leaves a coating on the surface of the meat, &c., which coating is impervious to air, and to a certain extent of moisture. Consequently as it is impossible for the air to reach the meat, &c., it will be preserved from decay a long period of time, according to the perfectness with which this invention is carried out.

The proportions of the several ingredients may be varied somewhat from the proportions hereinabove given and good results obtained; but practical experiment has demonstrated that the proportions herein given produce most satisfactory and practical results; and it is not intended to limit the invention to the proportions herein named, nor to the length of time in which the meat, &c., may be treated, as such time could vary without materially affecting the result, but as herein stated is satisfactory in its results.

Having thus described my invention, what I claim, and desire to secure by Letters Patent, is—

The herein-described compound, consisting of water, alum, granulated sugar, saltpeter, and gum-arabic, for the purpose specified.

In testimony whereof I have hereunto set my hand in the presence of two subscribing witnesses.

JOHN F. KENNEDY.

Witnesses:
   EDWIN W. BROWN,
   WM. S. BELLOWS.